United States Patent
Van Horn et al.

(10) Patent No.: US 9,507,988 B2
(45) Date of Patent: *Nov. 29, 2016

(54) HAND-MOUNTED DEVICE WITH FINGER MOTION TRIGGERING

(71) Applicant: Hand Held Products, Inc., Fort Mill, SC (US)

(72) Inventors: Erik Van Horn, Ocean View, NJ (US); Stephen Colavito, Garnet Valley, PA (US); Gregory Rueblinger, Strafford, NJ (US); Gennady Germaine, Cherry Hill, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,709

(22) Filed: Dec. 28, 2015

(65) Prior Publication Data
US 2016/0110579 A1    Apr. 21, 2016

Related U.S. Application Data

(63) Continuation of application No. 14/231,898, filed on Apr. 1, 2014, now Pat. No. 9,224,027.

(51) Int. Cl.
| | | |
|---|---|---|
| G06K 7/10 | (2006.01) | |
| H01Q 9/04 | (2006.01) | |
| G06K 7/14 | (2006.01) | |
| H01Q 1/22 | (2006.01) | |

(Continued)

(52) U.S. Cl.
CPC ......... *G06K 7/10891* (2013.01); *G06K 7/1091* (2013.01); *G06K 7/10396* (2013.01); *G06K 7/10554* (2013.01); *G06K 7/10722* (2013.01); *G06K 7/1443* (2013.01); *H01Q 1/2283* (2013.01); *H01Q 1/52* (2013.01); *H01Q 9/045* (2013.01); *H01Q 9/42* (2013.01)

(58) Field of Classification Search
CPC .......... G06K 7/1443; G06K 7/10891; G06K 7/1091; G06K 7/10396; G06K 7/10554; G06K 7/10722; H01Q 9/045; H01Q 9/42; H01Q 1/2283; H01Q 1/52
USPC .................................................... 235/472.01
See application file for complete search history.

(56) References Cited

U.S. PATENT DOCUMENTS

| | | | | |
|---|---|---|---|---|
| 5,191,197 A | * | 3/1993 | Metlitsky | G06K 7/10564 235/462.44 |
| 5,212,372 A | * | 5/1993 | Quick | G06F 3/014 235/462.44 |
| 5,340,972 A | | 8/1994 | Sandor | |

(Continued)

FOREIGN PATENT DOCUMENTS

| | | |
|---|---|---|
| EP | 2450828 A2 | 5/2012 |

OTHER PUBLICATIONS

Search Report and Written Exam in related EP Application No. 15159979.2, 6 pages, Dated Aug. 17, 2015.

*Primary Examiner* — Thien M Le
*Assistant Examiner* — Claude J Brown
(74) *Attorney, Agent, or Firm* — Additon, Higgins & Pendleton, P.A.

(57) ABSTRACT

A wearable device is worn on the back of a user's hand such that the act of pointing the user's index finger is sufficient to align the device and trigger a process. Triggering is achieved by sensing the user's finger in an image or by breaking a light path in a photogate.

18 Claims, 7 Drawing Sheets

(51) Int. Cl.
*H01Q 1/52* (2006.01)
*H01Q 9/42* (2006.01)

(56) References Cited

U.S. PATENT DOCUMENTS

| | | | | |
|---|---|---|---|---|
| 5,514,861 A * | 5/1996 | Swartz | ................ | G07G 1/0045 235/462.44 |
| 5,675,138 A * | 10/1997 | La | ..................... | G06K 7/10891 235/462.44 |
| 6,607,134 B1 * | 8/2003 | Bard | ..................... | G04B 47/00 235/462.44 |
| 6,853,293 B2 | 2/2005 | Swartz et al. | | |
| 8,842,919 B2 | 9/2014 | Katz et al. | | |
| 2004/0263473 A1 * | 12/2004 | Cho | ........................ | G06F 3/014 345/156 |
| 2006/0108425 A1 * | 5/2006 | Wiklof | ............... | G06K 7/10891 235/462.44 |
| 2012/0172085 A1 | 7/2012 | Vuppu et al. | | |
| 2012/0187192 A1 * | 7/2012 | Lee | .................... | G06K 7/10891 235/462.44 |
| 2013/0169536 A1 * | 7/2013 | Wexler | ................ | G09B 21/008 345/158 |

* cited by examiner

HAND-MOUNTED DEVICE WITH FINGER MOTION TRIGGERING

CROSS-REFERENCE TO RELATED APPLICATION

The present application claims the benefit of U.S. patent application Ser. No. 14/231,898 for a Hand-Mounted Indicia-Reading Device with Finger Motion Triggering filed Apr. 1, 2014 (and published Oct. 1, 2015 as U.S. Patent Publication No. 2015/0278570), now U.S. Pat. No. 9,224,027. Each of the foregoing patent application, patent publication, and patent is hereby incorporated by reference in its entirety.

FIELD OF THE INVENTION

The present invention relates to the field of barcode scanners and, more specifically, to the triggering of hand-worn indicia readers.

BACKGROUND

Generally speaking, wearable barcode scanners promote productivity and mobility for users who need to scan a large number of barcodes while also keeping their hands free. Under these circumstances, picking up and putting down a scanner would be tedious and distracting. What is more, non-wearable scanners can be easily dropped and damaged, leading to repair costs and losses in productivity.

Wearable scanners, such as a ring-mounted scanner, employ a barcode scanner worn like a ring on a user's right or left index finger. The ring-mounted scanner is connected to either a computer or wireless communication device worn on the wrist and attached to the ring scanner via a flexible cable. The scanner is powered by a battery so that the user is free to move around.

To use a ring-mounted scanner, the user points at a barcode to center the barcode within the scanner's field of view (i.e., scan line). Once centered, the user presses a push button, built into the side of the ring-mounted scanner, to initiate (i.e., trigger) the barcode scan.

Ring-mounted scanners are typically used in high-volume work environments, such as warehouses. Here, thousands of barcodes may be scanned during a routine shift. Mechanical push buttons (i.e., mechanical switches) on ring-mounted scanners pose reliability and serviceability concerns. Removing this push button would extend the service-free life of the scanner and potentially save the user from costs associated with repair and/or replacement. In addition, productivity losses resulting from scanner downtime would be reduced or eliminated. Therefore, a need exists for a wearable scanner, like the ring-mounted scanner but with a non-mechanical triggering method.

SUMMARY

Accordingly, in one aspect, the present invention embraces an indicia-reading device for reading indicia, such as barcodes. In an exemplary embodiment, the indicia-reading device is triggered by the natural motion of the user's finger (e.g., index finger). Once triggered, the indicia-capturing subsystem acquires information about the indicia within the indicia-capturing subsystem's field of view. This information is then decoded by the indicia-decoding subsystem. Next, an input/output subsystem can be used for relaying decoded signals to a host computer.

The indicia-capturing subsystem and the indicia-decoding subsystem are substantially enclosed by a hand-mounted housing, all of which are worn together on a user's hand and powered by a battery (e.g., a rechargeable battery). The indicia-reading device's hand-mounted housing is worn on the back of a user's hand so that both of the user's hands are free. The hand-mounted housing is positioned by finger rings for the user's middle and ring fingers so that the motion of the user's index finger (e.g., pointing at indicia) triggers the indicia-reading process.

Some indicia-reading devices have indicia-capturing subsystems (i.e., scan engines) that use image sensors to capture indicia information via image processing. Others use laser scanning to determine indicia information via the reflected light resulting from a laser beam scanned across the indicia.

Indicia-capturing subsystems, which use an image sensor (i.e., area scan engine), capture images within the image sensor's field of view. An imaging lens is used to project the indicia-reader's field of view onto a plurality of pixels, each pixel acting as a detector for a small portion of the field of view. When the indicia-reading device uses an image sensor, a processor may be used to detect the movement of the user's finger within the indicia-reader's field of view. The detection of this finger motion forms the basis of an image-based non-mechanical trigger mechanism that is used to start (i.e., trigger) an indicia-reading sequence.

When the indicia-capturing subsystem uses a scanned laser beam (i.e., linear scan engine), a photogate may be configured to detect the movement of the user's finger in order to start an indicia-reading sequence. The photogate uses a light source to create a light beam that acts as a sort of tripwire. A photogate housing supports the light source and positions it to face toward an opposite-facing detector. The movement of the user's finger disrupts the beam in the photogate-based non-mechanical trigger mechanism, and the indicia-reading sequence is started.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
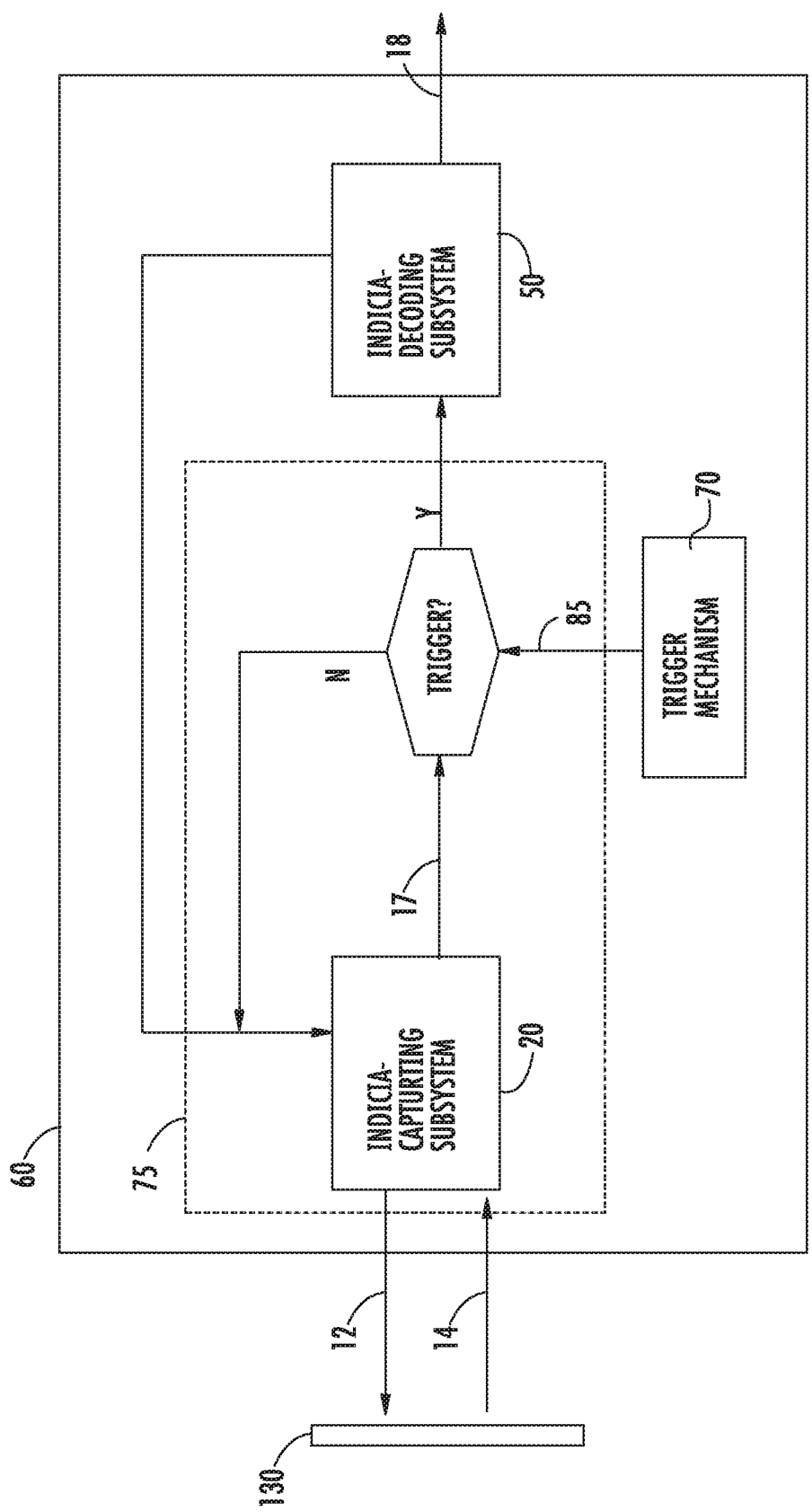
FIG. 1 schematically depicts the block diagram of a hand-mounted indicia-reading device.

As schematically depicted in the block diagram of FIG. 1, a hand-mounted indicia-reading device can have an indicia-capturing subsystem 20 for converting indicia (e.g., a barcode 130) into an electric raw signal 17 and an indicia-decoding subsystem 50 for recognizing and deciphering the information encoded into the electric raw signal 17 and then for relaying this decoded signal 18 in digital form to another system (e.g., a storage device or an input/output subsystem). The indicia-reading device contains these subsystems within a hand-mounted housing 60 or otherwise attached to a hand-mounted support. A non-mechanical trigger mechanism 70 can be used to initiate an indicia-reading sequence (i.e., a scan sequence) via an electric trigger signal 85.

The barcode 130 is captured and converted into an electric raw signal 17 by the indicia-capturing subsystem 20. Upon triggering, this electric raw signal 17 is sent to the indicia-decoding subsystem 50 for processing. Here, a processor (e.g., the processing core of a microcontroller) decodes the electric raw signal 17, rendering it into a digital decoded signal 18 that represents the indicium (e.g., the barcode).

The operating characteristics of the hand-mounted device for reading indicia are derived from the attributes of the indicia-capturing subsystem 20 (i.e., scan engine). The scan engine illuminates or scans a barcode 130 with transmitted radiation 12 (e.g., light) and converts the reflected radiation (e.g., reflected light 14) from a barcode 130 into either an analog or digital electric raw signal 17 depending on the scan engine architecture.

Figure 2:
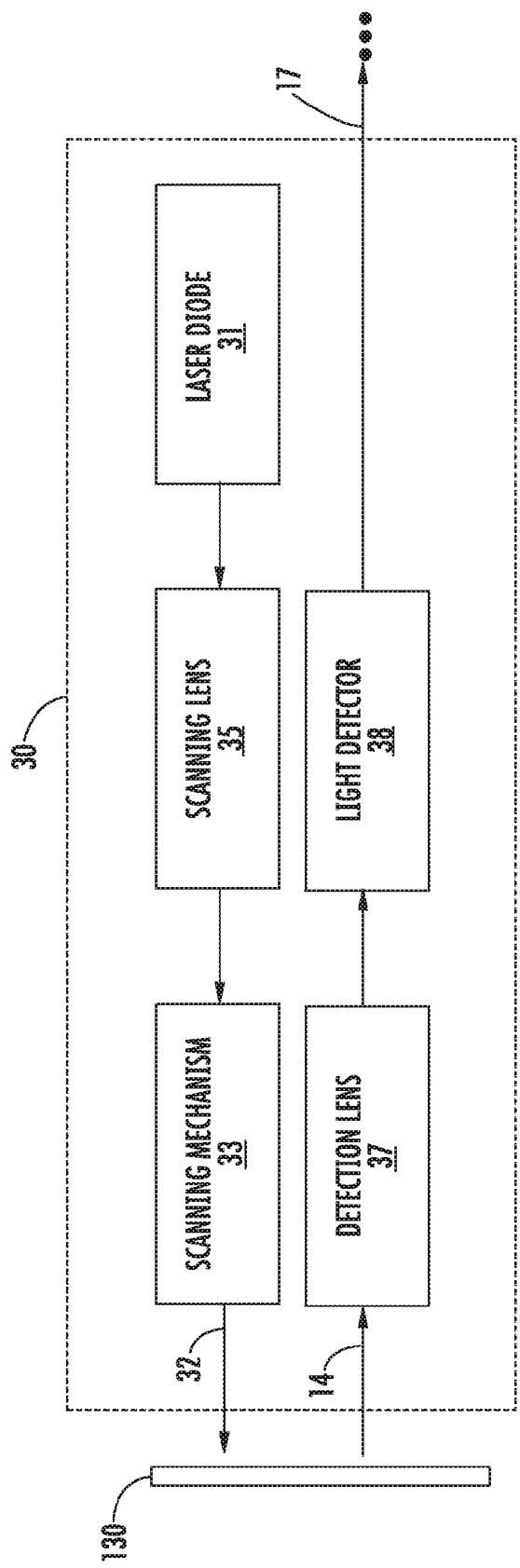
FIG. 2 schematically depicts the block diagram of a linear indicia-capturing subsystem (i.e., linear scan engine).

One kind of scan engine, used in hand-mounted indicia-reading devices, is known as a linear (i.e., 1-D) scan engine. A block diagram of this engine type is shown in FIG. 2. In the linear scan engine 30, a laser beam 32 generated by a laser diode 31 is focused onto a barcode 130 by a scanning lens 35. A reciprocating scanning mechanism 33 scans the beam back and forth across the barcode 130. The process of scanning the laser beam across a barcode generates reflected light 14 that is modulated by the light and dark areas of the 1-D barcode. This reflected light 14 is collected by a detection lens 37 that focuses the reflected light 14 onto a detector (e.g., a photodiode) 38. What results from the linear scan engine 30 is an electric raw signal 17 (i.e., an analog signal) that represents the barcode information. These scan engines are mechanically robust and can be used for long-range scanning. As the name suggests, however, 1-D scan engines can only scan linear 1-D barcodes.

Figure 3:
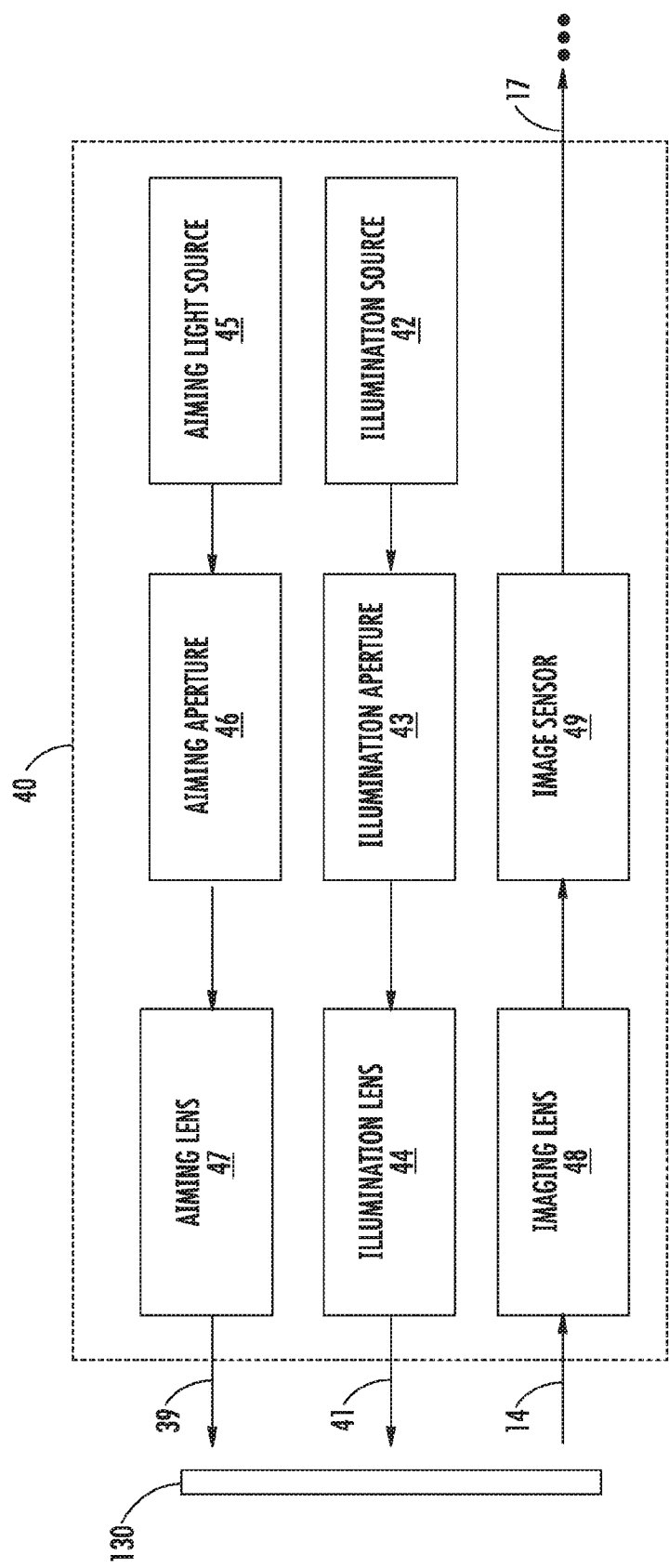
FIG. 3 schematically depicts the block diagram of an area indicia-capturing subsystem (i.e., area scan engine).

To scan two-dimensional barcodes (e.g., QR codes) an area (i.e., 2-D) scan engine may be used. 2-D scan engines are known for their adaptability to different indicia, and because they lend themselves to advanced image-processing algorithms that facilitate improved scan performance. As depicted in FIG. 3, the area scan engine 40 may include a multi-element image sensor (e.g., a. CCD) 49, instead of a scanned laser beam, to acquire indicia information.

In the area scan engine 40, illumination from a light source (e.g., LED) 42 illuminates an indicium (e.g., a 1-D or 2-D barcode). This illumination provides enough reflected light 14 for the image sensor 49 to acquire a good image. The shape and extent of the illumination light 41 is controlled by the illumination aperture 43 (e.g., square aperture) and the illumination lens 44.

In addition to illumination, aiming light 39 may also be projected as a pattern (e.g., cross-hair) onto the barcode 130 for the purpose of aligning and positioning the indicia reader with respect to the barcode 130. The aiming pattern results from an aiming light source 45 (e.g., a light emitting diode) transmitting (e.g., shining) through an aiming aperture 46 and, via an aiming lens 47, imaging onto the barcode 130.

In some embodiments, illumination is used without aiming. In others, aiming may be used without illumination. In still another embodiment, neither the illumination nor the aiming modules is used in the area scan engine 40. The configuration depends on the application details.

To capture the indicia information, the area scan engine 40 uses an imaging lens 48 to focus the reflected light 14 from the illuminated and aligned barcode 130 onto a plurality of pixels within the image sensor 49 (e.g., CCD). The pixels in the image sensor 49 can be thought of as tiny photodetectors, each receiving a small portion of the entire scene. Readout circuitry in the image sensor 49 creates an electric raw signal 17 representing the electronic response of each pixel so that a gray scale image of the field of view can be constructed.

Color image sensors 49 may also be used in an area scan engine 40 to provide color images. In a color image sensor 49, filters representing a primary (i.e., basis) color set (e.g., red, green, and blue) are arranged in a pattern (e.g., Bayer pattern) over the image sensor's pixels. A color image is created by measuring or interpolating the basis color responses for each image pixel. For example, each pixel in a color image is constructed by the red, green, and blue signal levels associated with that portion of the image. Color image sensors can be used to capture either black-and-white or colored indicia.

Either a gray scale or color image sensor may be used in an area scan engine 40 depending on the application (e.g., color image sensors could be used with colored indicia). In either case, what results from an area scan engine is an electric raw signal 17 representing the image of the barcode 130.

As illustrated in FIG. 1, the indicia-reading sequence (i.e., scan sequence) is initiated by the trigger signal 85. After the device is powered on, it operates in stand-by mode 75 awaiting a trigger signal 85. In the stand-by mode 75, the hand-mounted indicia-reading device repeatedly captures indicia information and converts it to electric raw signals 17. A processor continually monitors conditions for triggering. When a trigger condition is met (e.g., a signal exceeds a threshold value), the hand-mounted indicia-reading device moves out of stand-by mode 75 and the indicia-reading sequence commences. In the indicia-reading sequence, the indicia-capturing subsystem's output (i.e., the electric raw signal 17) is sent to the indicia-decoding subsystem 50. This electric raw signal 17 could be the last electric raw signal collected by the indicia-capturing subsystem 20 prior to the trigger condition, or it could be a new electric raw signal 17 collected immediately after the trigger condition occurs. Either way, after triggering, the electric raw signal 17 is processed and decoded by the indicia-decoding subsystem 50. After the scan sequence is complete, the device returns to stand-by mode 75 and again waits for a trigger signal 85.

Traditionally, the trigger signal 85 was obtained via a mechanically pressed switch (e.g., push button). In other words, a depressed push button established a trigger condition. In the present hand-mounted indicia-reading device, however, the trigger signal 85 can be obtained by the finger motion of the user. The mechanical switch is eliminated and with it the concerns for the mechanical failures. This non-mechanical trigger mechanism 70 is especially important in high-volume scanning environments.

In one exemplary embodiment, the trigger mechanism 70 is a photo-tripwire circuit. This circuit could include (i) a photogate light source 210, (ii) a photogate detector 220, (iii) a photogate housing 200, and (iv) circuitry for creating a trigger signal 85. This embodiment is simple and requires no image sensor but may require dedicated trigger hardware and electronics.

In another exemplary embodiment, the trigger mechanism is an image-sensing algorithm implemented by a processor. These algorithms may be stored in flash memory and may be used to analyze each frame of image data taken by the image sensor. This image sensor (e.g., CCD) can be the same image sensor 49 used for indicia capturing in order to reduce hardware complexity. A trigger condition may be established so that a trigger signal 85 is created whenever a user's finger appears within an image. In standby mode 75, the processor examines each image (i.e., frame) for a trigger condition and generates a trigger signal 85 to initiate an indicia-reading sequence whenever this condition is met.

Figure 4:
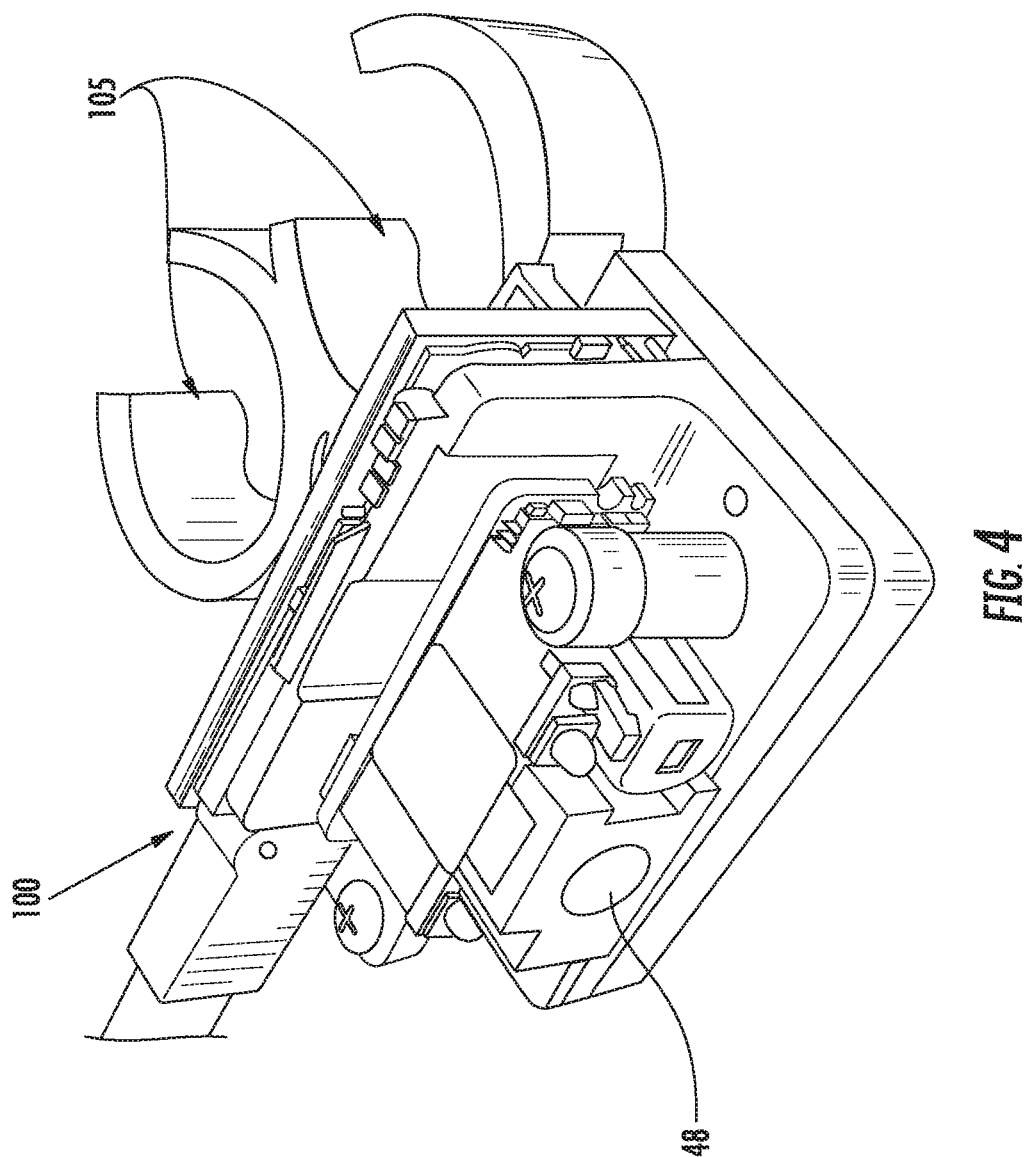
FIG. 4 depicts an exemplary hand-mounted indicia-reading device with an image-based non-mechanical trigger mechanism.

A prototype of an exemplary hand-mounted indicia-reading device with an image-based non-mechanical trigger mechanism is shown in FIG. 4. In this device, the fingers (e.g., middle and ring fingers) of the user are inserted into the finger rings 105. The imaging lens 48 of the device can be positioned so that when the user makes a fist, the imaging lens points perpendicularly away from the supporting fingers. As such, the act of pointing the index finger (i.e., the index finger on the hand wearing the indicia reader) while wearing the indicia-reading device aligns the scan engine's optical axis parallel with the outstretched finger. All subsystems are supported by the user's middle and ring fingers in the area between the user's knuckle and first joint.

Figure 5:
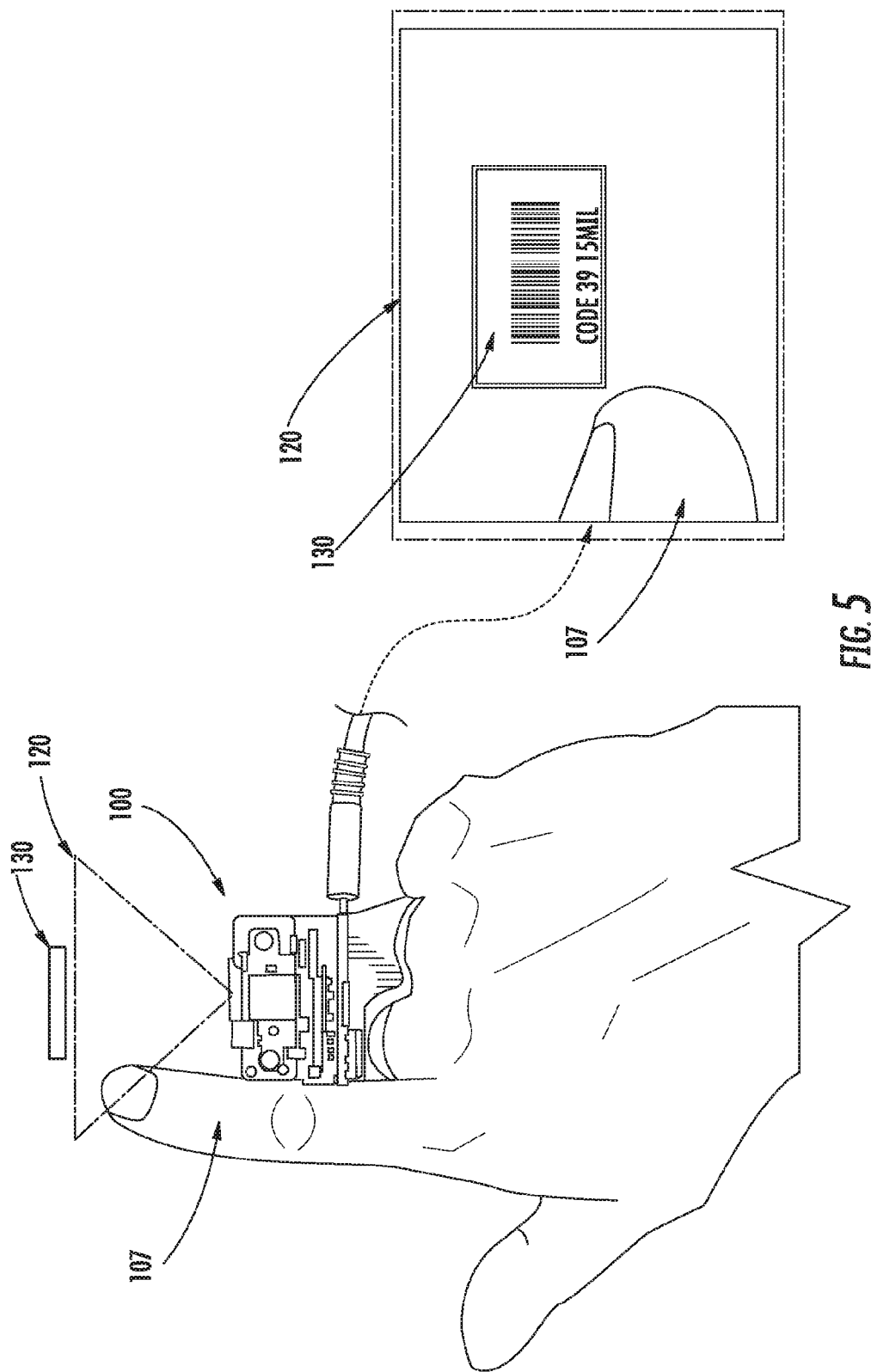
FIG. 5 depicts an exemplary hand-mounted indicia-reading device with an image-based non-mechanical trigger mechanism as worn and used.

FIG. 5 depicts an exemplary hand-mounted indicia-reading device with an image-based non-mechanical trigger mechanism as it is intended to be worn in operation. When wearing the indicia-reading device, the user's formation of a fist aligns the indicia-reader's field of view (i.e., FOV) 120 with the barcode 130, shown in FIG. 5 as a linear 1-D barcode. In this way, when the user points his index finger 107 (i.e., the index finger on the hand wearing the device) at the barcode 130, the barcode is positioned within the device's field of view 120 so that the barcode 130 is suitable to be captured and decoded.

In the embodiment shown in FIG. 5, the hand-mounted device for reading indicia 100 uses an area scan engine 40 as the indicia-capturing subsystem 20. Here, the image sensor 49 continuously gathers images. Each image (i.e., frame) is monitored for the presence of a triggering object (e.g., the index finger) by an algorithm run by the processor contained in the indicia-decoding subsystem 50. To start a scan using this image trigger embodiment of the trigger mechanism 70, the user moves his index finger slightly in the lateral direction toward the field of view 120 as shown in FIG. 5. When the index finger appears within the field of view 120, a trigger signal 85 is generated, and the appropriate electric raw signal 17 (e.g., the appropriate image) is sent to the indicia-decoding subsystem 50. The decoded signal 18 can then be transmitted to a host-device, memory, or a communication module before returning the indicia reader to the continual-image-gather-and-search loop (i.e., stand-by mode 75).

Figure 6:
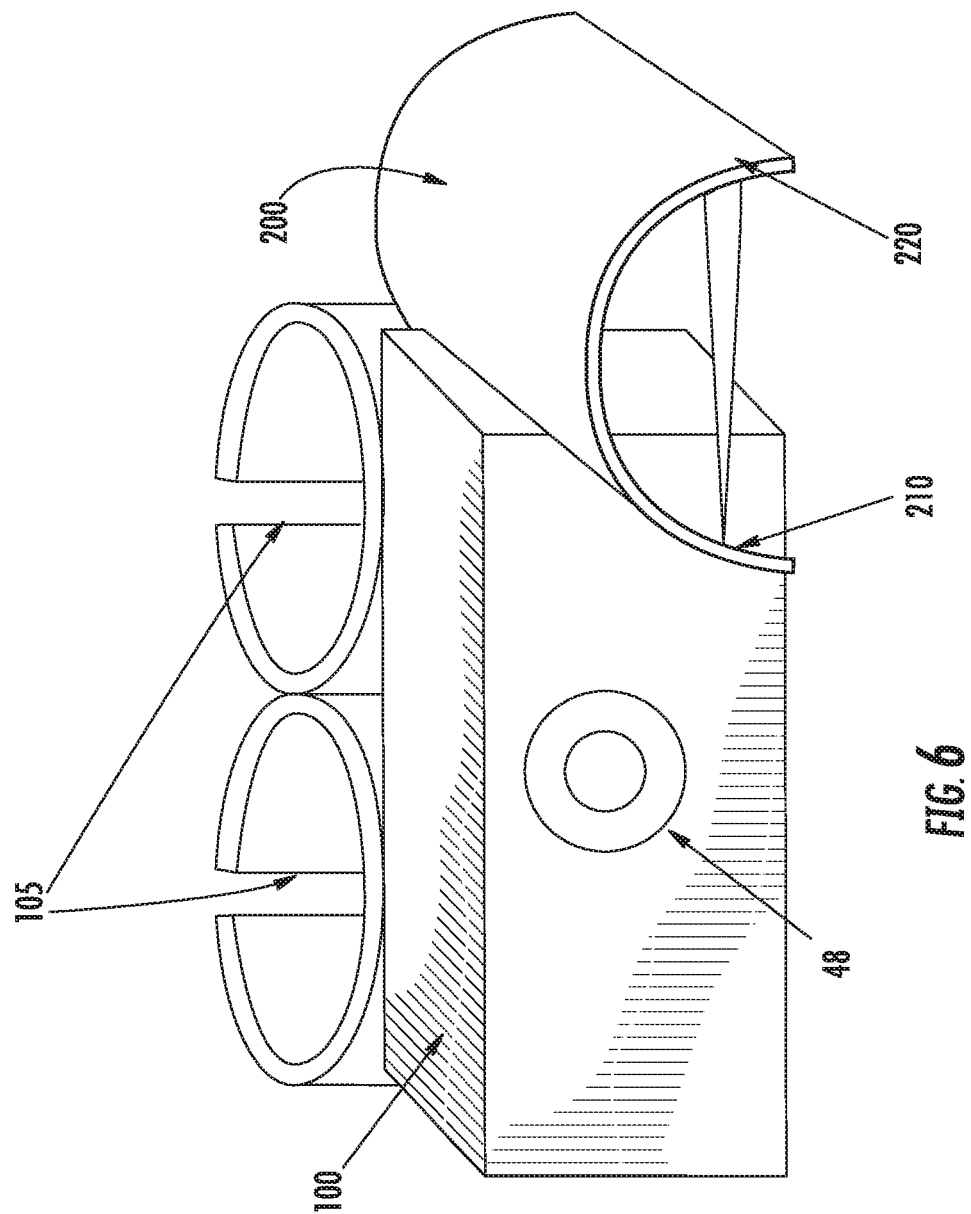
FIG. 6 depicts an exemplary hand-mounted indicia-reading mechanism with a photogate-based non-mechanical trigger mechanism.

Notwithstanding the foregoing, the trigger signal 85 need not be based on an image containing a finger. As mentioned previously, there may be other embodiments of the trigger mechanism where finger motion can trigger the indicia reader. FIG. 6 shows one such embodiment that requires no imaging for triggering. This embodiment is especially important for indicia-reading devices with linear scan engines that do not have integrated image sensors. In this case, a photogate switch, rather than an image analysis algorithm, may sense the movement of a finger.

Physically the photogate embodiment for the trigger mechanism 70 is similar to the previously mentioned image embodiment in the way that the indicia reader engages the user's hand. Two finger rings 105 are meant for the middle and ring fingers. When the user puts his fingers in the finger rings 105, the device rests on these fingers between the user's knuckle and first joint. In this embodiment, however, there is a photogate trigger assembly to detect the motion of the user's index finger. The photogate-based non-mechanical trigger mechanism includes a photogate housing 200, a light source 210, and a detector 220. When the user's fingers are curled towards the palm (i.e., formed into a fist), the photogate housing 200 is empty and the light from the source 210 hits the detector 220. When the user points his index finger at a barcode 130, the region within the photogate housing is filled and the user's finger blocks the light beam.

Figure 7:
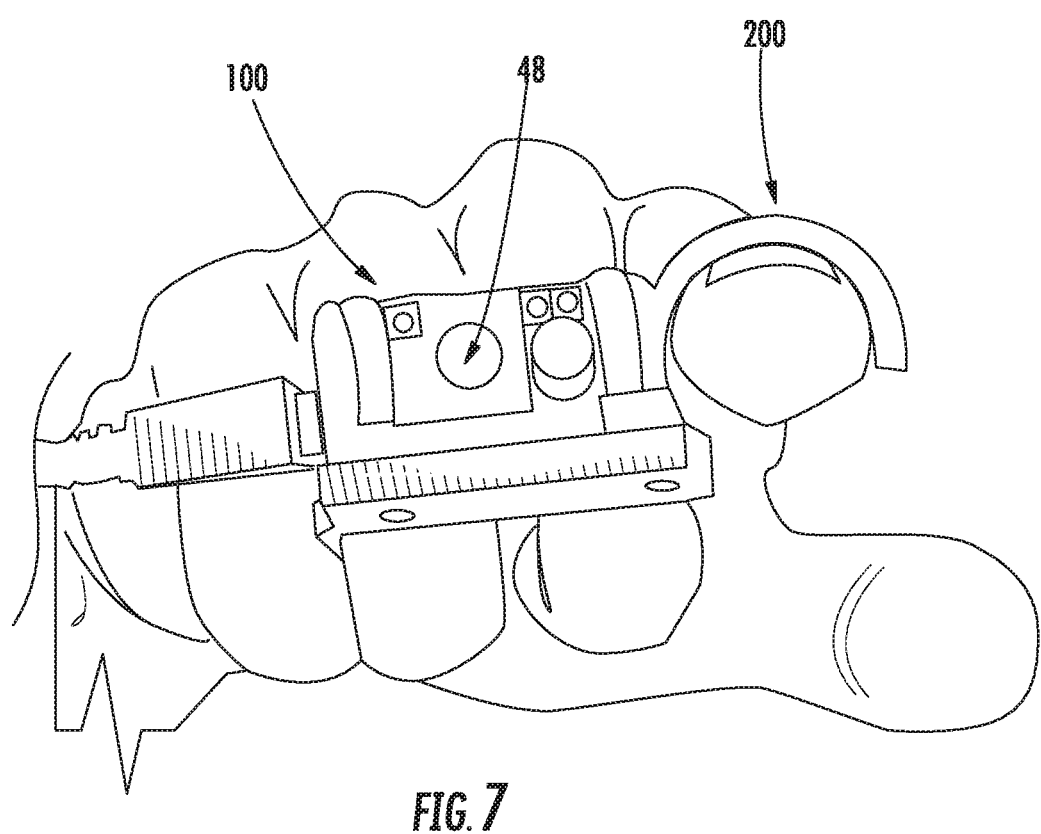
FIG. 7 depicts an exemplary hand-mounted indicia-reading device with a photogate-based non-mechanical trigger mechanism as worn and used.

FIG. 7 depicts an exemplary hand-mounted indicia-reading device with a photogate-based non-mechanical trigger mechanism on a user's hand with the user's index-finger engaged with the photogate housing 200. In effect, the photogate-based non-mechanical trigger mechanism acts as an optical tripwire. The act of pointing the user's index finger at indicia is sufficient to block the optical beam and trigger the hand-mounted device to start the indicia-reading sequence.

In general, both non-mechanical trigger embodiments send a trigger signal 85 as a result of some motion of the user's finger (i.e., pointing at the indicia). Both embodiments also eliminate the use of a mechanical switch. The choice between the two trigger mechanisms depends primarily on the application and on the characteristics of indicia-capturing subsystem 20. Area scan engines are especially well suited for the image-based non-mechanical trigger mechanism, because the image sensor is already integrated into the indicia-reading device. Linear scan engines, on the other hand, are especially well suited for the photogate-based non-mechanical trigger mechanism. Of course, this is not to say that an area scan engine precludes the use of a photogate-based non-mechanical trigger mechanism and vice versa. Likewise the use of a linear scan engine does not preclude the use of an image-based non-mechanical trigger mechanism.

Whether the trigger signal is generated via a photogate or through image analysis, the "point and shoot" hand-mounted indicia reading device eases operation because it uses natural movements and is intuitive to use. In addition, the non-mechanical trigger mechanism eliminates any potential problems associated with conventional mechanical trigger mechanisms.

To supplement the present disclosure, this application incorporates entirely by reference the following patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,819; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;

U.S. Pat. No. 8,556,176; U.S. Pat. No. 8,556,177;
U.S. Pat. No. 8,559,767; U.S. Pat. No. 8,559,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,593,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
International Publication No. 2013/163789;
International Publication No. 2013/173985;
International Publication No. 2014/019130;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0169999;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. Patent Application Publication No. 2014/0027518;
U.S. Patent Application Publication No. 2014/0034723;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0061307;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/736,139 for an Electronic Device Enclosure, filed. Jan. 8, 2013 (Chaney); U.S. patent application Ser. No. 13/750,304 for Measuring Object Dimensions Using Mobile Computer, filed Jan. 25, 2013; U.S. patent application Ser. No. 13/771,508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/734,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792,322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/895,846 for a Method of Programming a Symbol Reading System, filed Apr. 10, 2013 (Corcoran); U.S. patent application Ser. No. 13/902,110 for a System and Method for Display of Information Using a Vehicle-Mount Computer, filed May 24, 2013 (Hollifield); U.S. patent application Ser. No. 13/902,144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini) U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); U.S. patent application Ser. No. 14/035,474 for Augmented-Reality Signature Capture, filed Sep. 24, 2013 (Todeschini); U.S. patent application Ser. No. 14/047,896 for Terminal Having Illumination and Exposure Control filed Oct. 7, 2013 (Jovanovski et al.); U.S. patent application Ser. No. 14/035,474 for Augmented-Reality Signature Capture, filed Sep. 24, 2013 (Todeschini); U.S. patent application Ser. No. 14/050,515 for Hybrid-Type Bioptical, filed Oct. 10, 2013 (Edmonds et al.); U.S. patent application Ser. No. 14/053,175 for Imaging Apparatus Having Imaging Assembly, filed Oct. 14, 2013 (Barber) U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/055,383 for Dimensioning System, filed Oct. 16, 2013 (Li et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.); U.S. patent application Ser. No. 14/074,787 for Method and System for Configuring Mobile Devices via NFC Technology, filed Nov. 8, 2013 (Smith et al.); U.S. patent application Ser. No. 14/082,468 for Encoded Information Reading Terminal with Wireless Path Selection Capability, filed Nov. 18, 2013 (Wang et al.); U.S. patent application Ser. No. 14/087,190 for Optimal Range indicators for Bar Code Validation, filed Nov. 22, 2013 (Hejl); U.S. patent application Ser. No. 14/093,484 for System for Capturing a Document in an Image Signal, filed Dec. 1, 2013 (Showering); U.S. patent application Ser. No. 14/093,487 for Method and System Operative to Process Color Image Data, filed Dec. 1, 2013 (Li et al.); U.S. patent application Ser. No. 14/093,490 for Imaging Terminal Having Image Sensor and Lens Assembly, filed Dec. 1, 2013 (Havens et al.); U.S. patent application Ser. No. 14/093,624 for Apparatus Operative for Capture of Image Data, filed Dec. 2, 2013 (Havens et al.); U.S. patent application Ser. No. 14/094,087 for Method and System for Communicating Information in an Digital Signal, filed Dec. 2, 2013 (Peake et al.); U.S. patent application Ser. No. 14/101,965 for High Dynamic-Range Indicia Reading System, filed Dec. 10, 2013 (Xian); U.S. patent application Ser. No. 14/107,048 for Roaming Encoded Information Reading Terminal, filed Dec. 16, 2013 (Wang et al.); U.S. patent application Ser. No. 14/118,400 for Indicia Decoding Device with Security Lock, filed Nov. 18, 2013 (Liu); U.S. patent application Ser. No. 14/138,206 for System and Method to Store and Retrieve Identifier Associated Information, filed Dec. 23, 2013 (Gomez et al.); U.S. patent application Ser. No. 14/143,399 for Device Management Using Virtual Interfaces, filed Dec. 30, 2013 (Caballero); U.S. patent application Ser. No. 14/147,992 for Decoding Utilizing Image Data, filed Jan. 6, 2014 (Meier et al.); U.S. patent application Ser. No. 14/150,393 for Indicia-reader Having Unitary Construction Scanner, filed Jan. 8, 2014 (Colavito et al.); U.S. patent application Ser. No. 14/153,111 for Indicia Reading Terminal Including Frame Quality Evaluation Processing, filed Jan. 13, 2014 (Wang et al.); U.S. patent application Ser. No. 14/153,142 for Imaging Apparatus Comprising Image Sensor Array having Shared Global Shutter Circuitry, filed Jan. 13, 2014 (Wang); U.S. patent application Ser. No. 14/153,182 for System and Method to Manipulate an Image, filed Jan. 13, 2014 (Longacre et al.); U.S. patent application Ser. No. 14/153,213 for Apparatus Comprising Image Sensor Array and Illumination Control, filed Jan. 13, 2014 (Ding); U.S. patent application Ser. No. 14/153,249 for Terminal Operative for Storing Frame of Image Data, filed Jan. 13, 2014 (Winegar); U.S. patent application Ser. No. 14/154,207 for Laser Barcode Scanner, filed Jan. 14, 2014 (Hou et al.); U.S. patent application Ser. No. 14/154,915 for Laser Scanning Module Employing a Laser Scanning Assembly having Elastomeric Wheel Hinges, filed Jan. 14, 2014 (Havens et al.); U.S. patent application Ser. No. 14/158,126 for Methods and Apparatus to Change a Feature Set on Data Collection Devices, filed Jan. 17, 2014 (Berthiaume et al.); U.S. patent application Ser. No. 14/159,074 for Wireless Mesh Point Portable Data Terminal, filed Jan. 20, 2014 (Wang et al.); U.S. patent application Ser. No. 14/159,509 for MMS Text Messaging for Hand Held Indicia Reader, filed Jan. 21, 2014 (Kearney); U.S. patent application Ser. No. 14/159,603 for Decodable Indicia Reading Terminal with Optical Filter, filed Jan. 21, 2014 (Ding et al.); U.S. patent application Ser. No. 14/160,645 for Decodable Indicia Reading Terminal with Indicia Analysis Functionality, filed Jan. 22, 2014 (Nahill et al.); U.S. patent application Ser. No. 14/161,875 for System and Method to Automatically Discriminate Between Different Data Types, filed Jan. 23, 2014 (Wang); U.S. patent application Ser. No. 14/165,980 for System and Method for Measuring Irregular Objects with a Single Camera filed Jan. 28, 2014 (Li et al.); U.S. patent application Ser. No. 14/166,103 for Indicia Reading Terminal Including Optical Filter filed Jan. 28, 2014 (Lu et al.); U.S. patent application Ser. No. 14/176,417 for Devices and Methods Employing Dual Target Auto Exposure filed Feb. 10, 2014 (Meier et al.); U.S. patent application Ser. No. 14/187,485 for Indicia Reading Terminal with Color Frame Processing filed Feb. 24, 2014 (Ren et al.); U.S. patent application Ser. No. 14/200,405 for Indicia Reader for Size-Limited Applications filed Mar. 7, 2014 (Feng et al.); U.S. patent application Ser. No. 14/342,544 for Imaging Based Barcode Scanner Engine with Multiple Elements Supported on a Common Printed Circuit Board filed Mar. 4, 2014 (Liu et al.); U.S. patent application Ser. No. 14/342,551 for Terminal Having Image Data Format Conversion filed Mar. 4, 2014 (Lui et al.); and U.S. patent application Ser. No. 14/345,735 for Optical Indicia Reading Terminal with Combined Illumination filed Mar. 19, 2014 (Ouyang).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An image-capturing device, comprising:
an image-capturing subsystem including a multi-element image sensor for capturing images of the image-capturing subsystem's field of view;
a hand-mounted housing substantially enclosing the image-capturing subsystem, wherein the hand-mounted housing comprises finger rings to attach to the user's middle and ring fingers so that, when a user makes a fist and fully extends the user's index finger, the user's index finger and the image-capturing subsystem are pointed substantially in the same direction; and
a non-mechanical trigger mechanism configured to initiate an image-capturing sequence performed by the image-capturing subsystem if the user's index finger is detected in the images captured by the image-capturing subsystem.

2. The image-capturing device according to claim 1, comprising a processor for decoding indicia information within the image-capturing subsystems field of view and for analyzing the images captured by the image-capturing subsystem to detect the presence of a user's finger.

3. The image-capturing device according to claim 1, wherein the image-capturing device comprises a laser for emitting light, a scanning mechanism for scanning the emitted light, and a detector for sensing laser light reflected or scattered off an object.

4. The image-capturing device according to claim 1, wherein the multi-element image sensor comprises a CCD having a plurality of pixels.

5. The image-capturing device according to claim 4, wherein the CCD captures color images.

6. The image-capturing device according to claim 1, comprising a lens.

7. The image-capturing device according to claim 1, comprising an input/output subsystem for outputting signals to a host computer.

8. The image-capturing device according to claim 1, wherein the image-capturing device is powered by a battery.

9. A method, comprising:
providing an image-capturing device that comprises an image-capturing subsystem for capturing images of the image-capturing subsystem's field of view and a non-mechanical trigger mechanism for initiating an image-capturing sequence via a trigger signal;
capturing images of the image-capturing subsystem's field of view; and
generating a trigger signal if a user's finger is detected in the captured images;
wherein the image-capturing device comprises two finger rings to attach to a user's middle and ring fingers so that when attached, the image-capturing device rests on the user's middle and ring fingers between the user's knuckle and first joint of the middle and ring fingers.

10. The method according to claim 9, wherein detecting the user's index finger in the captured images comprises:
pointing the image-capturing subsystem towards an indicium for decoding, and
extending the user's index finger to point at the indicium for decoding.

11. The method according to claim 10, wherein detecting the user's index finger in the captured images comprises detecting if the user's index finger is moving laterally towards the image-capturing subsystem.

12. The method according to claim 9, wherein the image-capturing subsystem comprises a multi-element image sensor.

13. The method according to claim 12, wherein the multi-element image sensor is a CCD.

14. The method according to claim 13, wherein the CCD captures color images.

15. A non-mechanical triggering mechanism for a finger-mounted image-capturing device, comprising:
a multi-element image sensor for repeatedly capturing images of a field of view; and
a processor communicatively coupled to the multi-element image sensor, the processor configured by software to:
receive a captured image from the multi-element image sensor;
analyze the received captured image for the presence of a finger; and
generate, if a finger is present in one or more captured images, a trigger signal to initiate an image-capturing sequence;
wherein the finger-mounted image-capturing device comprises two finger rings for a user's middle and ring fingers.

16. The non-mechanical triggering mechanism for a finger-mounted image-capturing device according to claim 15, wherein the multi-element image sensor is a CCD.

17. The non-mechanical triggering mechanism for a finger-mounted image-capturing device according to claim 16, wherein the CCD captures color images.

18. The non-mechanical triggering mechanism for a finger-mounted image-capturing device according to claim 15, wherein the finger present in the one or more captured images is the user's index finger.

* * * * *